Figure 4:
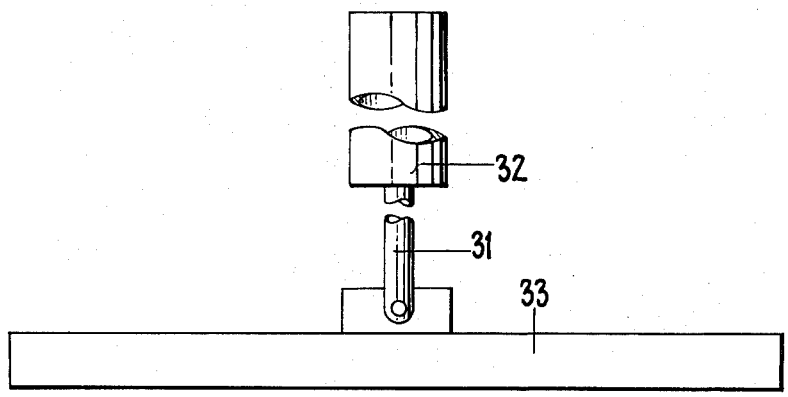
Figure 4:
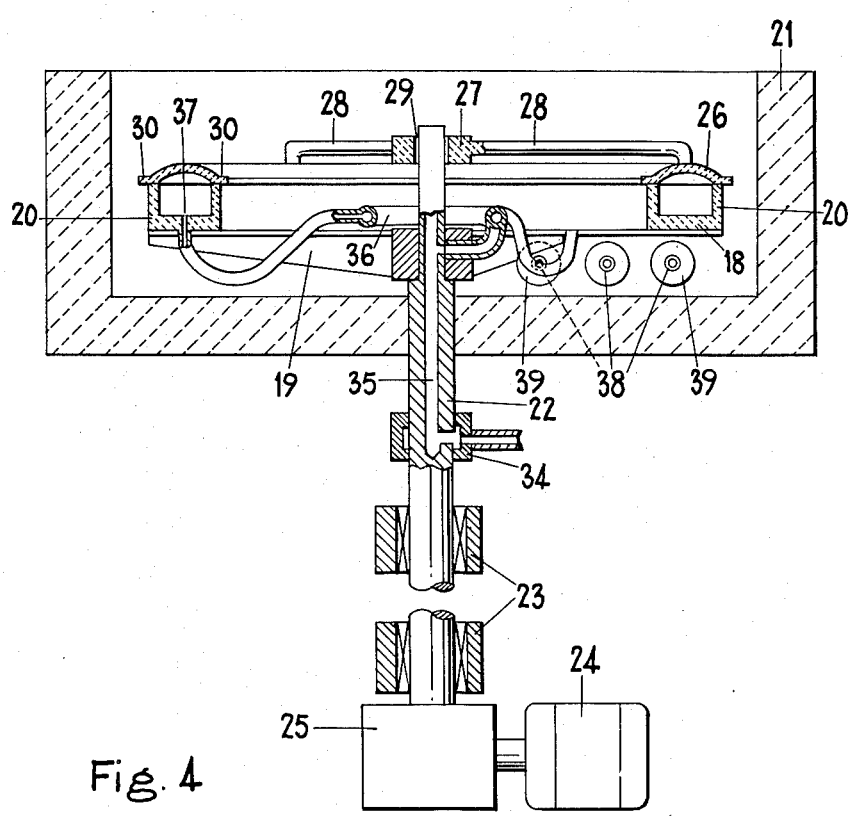

July 18, 1961  R. L. BREADNER  2,992,513
MANUFACTURE OF GLASS-TO-METAL SEALS
Filed Jan. 21, 1959  4 Sheets-Sheet 1
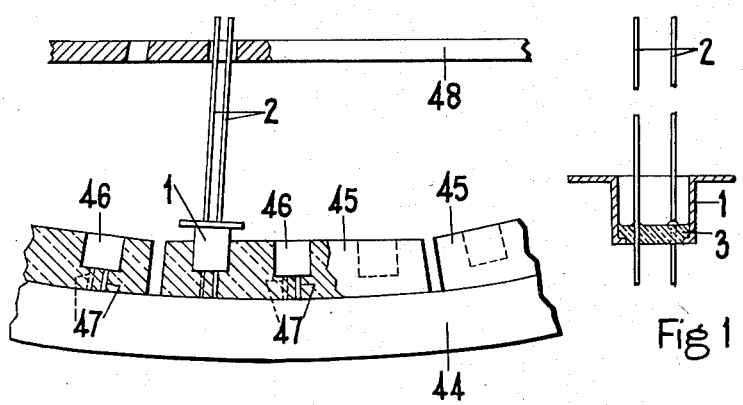
Fig. 7
Fig. 1
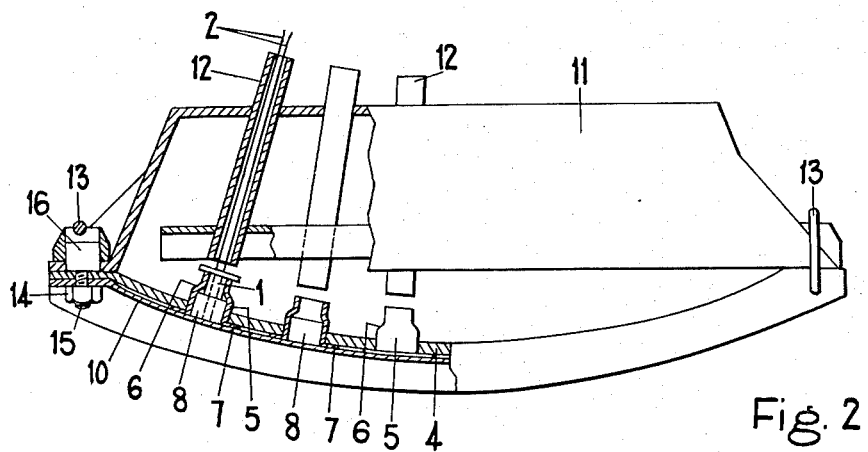
Fig. 2
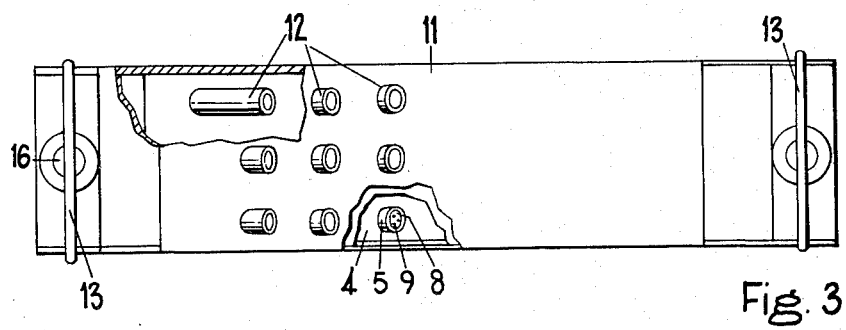
Fig. 3
INVENTOR
ROBERT LEONARD BREADNER
BY
ATTORNEYS July 18, 1961 R. L. BREADNER 2,992,513
MANUFACTURE OF GLASS-TO-METAL SEALS
Filed Jan. 21, 1959 4 Sheets-Sheet 2

INVENTOR
ROBERT LEONARD BREADNER
BY
Kirschstein, Kirschstein & Ottinger
ATTORNEYS July 18, 1961     R. L. BREADNER     2,992,513
MANUFACTURE OF GLASS-TO-METAL SEALS Filed Jan. 21, 1959     4 Sheets-Sheet 3

INVENTOR
ROBERT LEONARD BREADNER
BY
ATTORNEYS

July 18, 1961    R. L. BREADNER    2,992,513
MANUFACTURE OF GLASS-TO-METAL SEALS
Filed Jan. 21, 1959    4 Sheets-Sheet 4

INVENTOR
ROBERT LEONARD BREADNER
BY
Finckstein, Finckstein Ottinger
ATTORNEYS

United States Patent Office 2,992,513
Patented July 18, 1961

2,992,513
MANUFACTURE OF GLASS-TO-METAL SEALS
Robert Leonard Breadner, Kenton, England, assignor to The General Electric Company Limited, London, England
Filed Jan. 21, 1959, Ser. No. 788,096
Claims priority, application Great Britain Jan. 23, 1958
8 Claims. (Cl. 49—1)

This invention relates to the manufacture of seals of the kind in which one or more elongated metal conducting elements, for example wires, rods or tubes, hereinafter referred to simply as wires (it being understood that the use of a single said conducting element is included), are sealed within an aperture in another member by means of a glass bead which fills the cross-section of at least part of the aperture. The invention is particularly concerned with such seals in which the apertured member, which may for example consist of a collar or sleeve, is of copper and the metal wires are also of copper or of a copper-clad metal alloy, but the method in accordance with the invention also has application where the apertured member or wires are of other metals or alloys, for example "Kovar," or where the apertured member is ceramic.

In any such seal the glass used must, of course, be suitably matched to the wires and apertured member as regards their thermal expansion coefficients to avoid the setting up of excessive stresses in the glass on cooling which might lead to breakages of the seal.

In making a seal of the kind referred to, it has hitherto been usual to position the wires within the said aperture by means of a suitable jig arrangement located at one end of the aperture, to support the glass charge in the form of a short length of tubing within the aperture, to heat up the assembly by needle gas flames able to pass within the aperture so as to soften the glass, and to press the softened glass between a surface of the jig and a plunger designed to enter the opposite end of the aperture, so as to embed the wires in the glass and bring the glass into sealing contact everywhere around the periphery of the aperture.

Whilst this can readily be carried out with members having apertures of comparatively large diameter, it is difficult to effect in cases where the apertures are of very small diameter, for example a few millimetres. In particular it becomes difficult to control the heating so that whilst the glass is adequately melted the metal wires or the apertured member are not overheated and softened or the oxide film on the metal surfaces necessary for forming a good seal, destroyed.

In addition where small components are used to form the seal the relatively small thermal capacity of the components employed often results in the glass being cooled too rapidly when the jig and plunger are brought into contact with it and consequently in the production of improperly-formed seals. Moreover where the apertured member consists of a sleeve having very thin walls it may easily be distorted during the pressing operation.

For the above reasons, when forming relatively small seals the jig is usually provided with a carbon surface and arranged with said surface closing an end of the aperture, the glass charge, which may consist of a short length of tubing or be in powder or fragmentary form, is heated until molten and, instead of the glass being pressed, reliance is had on surface tension effects for drawing the glass bead into position. However, this leads to an undesirable number of rejects in the mass production of small seals in this way, and the primary object of this invention is to provide an improved method for the manufacture of seals of the kind referred to that is especially suitable for the mass production of small seals.

According to the invention, in the manufacture of a seal of the kind referred to the apertured member is mounted on a holder having a non-glass-wetted part closing one end of the aperture, the wires are inserted in the aperture and are supported in the positions in which they are to be sealed to the member, the glass charge is inserted within the aperture, the holder is placed within a centrifuge in a furnace, with the wires lying radially and with the end of the aperture closed by said non-glass-wetted part of the holder directed outwards, and the centrifuge is heated either directly or indirectly within the furnace to the appropriate glass melting temperature whilst the centrifuge is rotated at a speed sufficient for the centrifugal force generated to press the molten glass into good sealing contact with the wires and the member.

The term "non-glass-wetted part" means that the part of the holder is formed of a material which is not wetted by the glass during the process, and thus does not become attached to the glass. At present carbon is the most suitable material for the kinds of glasses normally used in making glass-to-metal seals and the said holder part preferably consists of carbon or is provided with a carbon layer on its surface presented to the aperture in said member.

By mounting a number of holders side by side within the centrifuge, a large number of seals can be manufactured in a single operation of the centrifuge by the method in accordance with the invention.

Preferably the wires are supported in the positions in which they are to be sealed to the apertured member by fitting into locating holes provided in the said non-glass-wetted part of the holder, although if the wires are hollow they may be supported, if desired, by fitting over locating pins projecting from the non-glass-wetted part of the holder.

Where the apertured member has a plurality of apertures extending through it in the same direction wires may be sealed into two or more of said apertures simultaneously by the method of the invention, if desired.

Preferably the metal parts used are introduced into the holders in a pre-oxidised form, and the centrifuge is of a closed type and is filled with an inert gas, such as nitrogen, during the heating in the furnace. In this way the optimum surface conditions for the sealing are ensured and with the close temperature control obtainable by effecting the heating within a furnace, which control is assisted by the turbulence produced by the centrifuging, seals of good quality can consistently be obtained.

In addition, the slow cooling down of the centrifuge, preferably effected by de-energising and opening the furnace with the centrifuge still rotating, ensures a suitable annealing of the seals.

The centrifuge can most conveniently be formed of a highly refractory material which can be directly heated whilst rotating by means of air/gas-flame passing through an aperture in the walls of the furnace from a burner located outside the furnace. Silica or a suitable refractory metal or alloy, such as chronite, which is able to withstand the heat produced and does not have a detrimental effect on the quality of the seals, are suitable materials for this purpose. In such an arrangement the rapid rotation of the centrifuge ensures the required even heating of the centrifuge and of the holders within it. After the formation of the seals the centrifuge can then conveniently be cooled down whilst still rotating by shutting off the gas jet and leaving the air jets blowing on to the centrifuge.

The invention is particularly suited to the manufacture of seals forming part of the envelopes or containers of semi-conductor devices, such as transistors or of other small electrical devices and the application of the invention to the mass production of several different forms of such seals will now be described by way of example with reference to FIGURES 1 to 13 of the accompanying schematic drawings.

Figure 5:
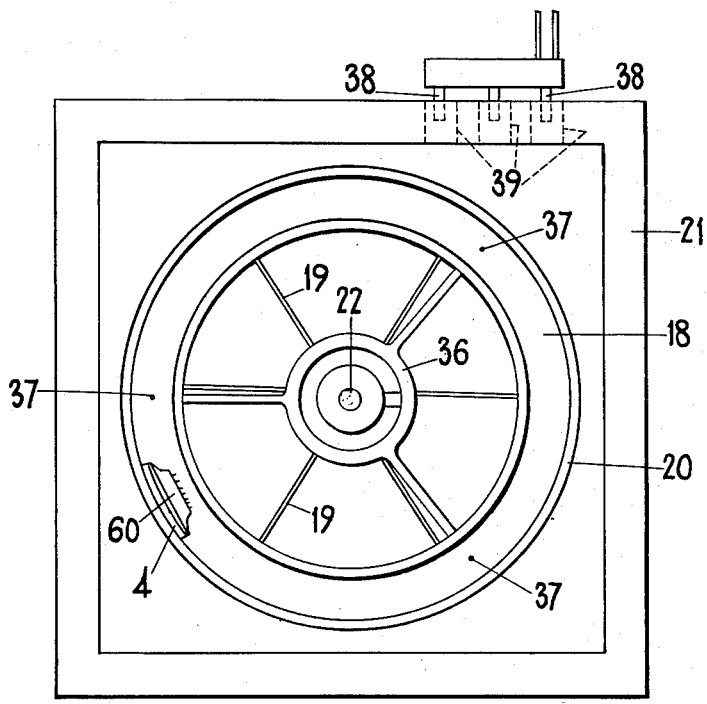
Figures 6, 8:
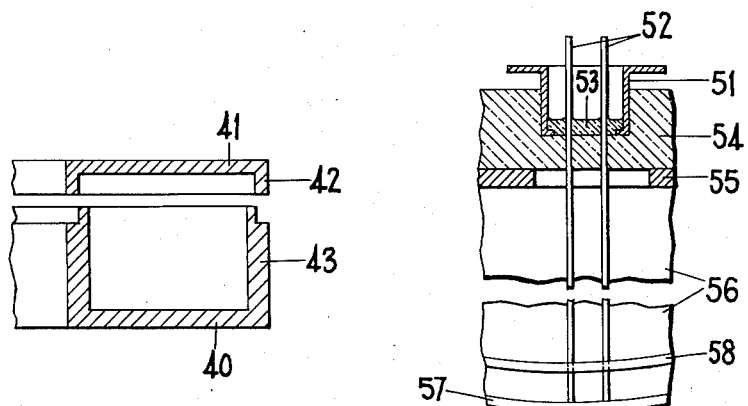

In these drawings FIGURE 1 represents an axial section through one of the seals, FIGURES 2 and 3 represent a side view and a plan view of a holder assembly suitable for use in the mass-production of a number of seals of the kind illustrated in FIGURE 1, FIGURES 4 and 5 represent a sectional elevation and a plan view respectively of one form of centrifuge apparatus for use in forming the seals;

FIGURE 6 represents a sectional view of part of a modified form of the centrifuge apparatus illustrated in FIGURES 4 and 5, FIGURE 7 represents part of an alternative form of holder assembly suitable for forming seals of the form illustrated in FIGURE 1, and FIGURES 8 to 13 each represents a section through a different one of the other seals together with part of a suitable form of holder assembly.

Referring now to FIGURE 1 the seal shown consists of a cylindrical copper sleeve 1 outwardly flanged at one end and having three copper-clad nickel-iron wires 2 sealed through a glass bead 3 closing the other end of the sleeve, the wires extending through the sleeve and being insulated from the sleeve by the glass bead.

The axial length and internal diameter of the copper cylinder are each about 4 millimetres, and the wall thickness is about 0.25 millimetre. The wires 2 each have a diameter of about 0.4 millimetre, and extend approximately 5 millimetres from the closed end of the sleeve and approximately 50 millimetres from the flanged end of the sleeve.

In one method of manufacturing a number of such seals in accordance with the invention the sleeves and wires are all initially provided with a coating of cuprous oxide by heating and quenching in known manner.

The components for forming the seals are loaded into a number of holder assemblies in the form of arcuate metal boats and each providing a multiplicity of holders for holding a corresponding number of sets of components.

Each boat conveniently includes, as shown in FIGURES 2 and 3, a rectangular nickel base plate 4 bent to arcuate form along its length and provided with a multiplicity of circular holes each of about 5 millimetres diameter. Within each hole there is located a thin-walled nickel cup 5 (only some of which are shown) open at both ends and consisting of a part of larger diameter and a part of smaller diameter separated by an annular shoulder 6, the cups being fitted into the holes with their smaller ends directed towards the centre of curvature of the base and each being held in position by the welding of an outwardly-turned flange 7 at the wider end of the cup to the outer surface of the base. Into a wider end of each cup so as to abut against the shoulder 6, is inserted a cylindrical carbon plug 8 pierced by three holes 9 parallel to its axis, and the plugs are all secured in position by a single nickel backing plate 10 extending over the wider ends of the cups and attached to the ends of the base 4 by means of nuts 14 screwing on to threaded studs 15.

The copper sleeves are arranged to be a sliding fit within the narrower ends of the base cups and are held by these parts with the unflanged ends of the sleeves abutting against the faces of the carbon plugs 8.

A small tube of glass for forming the required glass bead, and of slightly smaller diameter than the sleeve, is inserted into each sleeve, and a bridge piece 11, carrying nickel tubes 12 arranged so that they each extend coaxially with respect to a corresponding one of the sleeves, is clipped to the ends of the boat by means of spring clips 13. The heads 16 of the studs 15 fit into corresponding holes at the ends of the bridge piece and serve to locate the tubes 12 with respect to the sleeves 1. Into each nickel tube are then fed three of the copper-clad nickel-iron wires 2 and the assembly is vibrated, holding the tubes uppermost, to cause the wires to be fed into the holes 9 in the carbon plugs 8, the holes serving to support the wires in predetermined positions within the respective sleeves.

A number of the boats loaded in this way are then placed in a centrifuge apparatus. This consists, as shown in FIGURES 4 and 5, of an annular silica tray 18 having upturned sides 20 mounted on a metal frame 19 within a furnace 21, the frame being attached to the top end of a vertical shaft 22 so as to support the tray coaxial with the shaft, and the shaft projecting downwards through the bottom of the furnace into bearings 23 mounted on a suitable supporting framework (not shown). An electric motor 24 provides the drive for the shaft and hence the tray in use of the apparatus, the shaft being coupled to the motor through an appropriate gear system 25.

The annular tray 18 is provided with a close-fitting but detachable silica lid 26 also of annular form and connected to a central boss 27 by means of three radial spokes 28, the boss being provided with a hole 29 arranged to fit over the top of the shaft when the lid is placed onto the tray. The inner and outer edges of the tray are provided with inwardly and outwardly directed flanges 30 respectively which rest on the top edges of the sides of the tray as shown.

The top 33 of the furnace is also detachable to give access to the tray, being conveniently carried by the lower end of a vertical support rod 31 having its upper end attached to a vacuum-actuated piston located within a cylinder 32, catches (not shown) being provided for locking the furnace top in the raised position.

When loaded into the centrifuge apparatus the boats 60 are placed with their arcuate bases 4 fitting against the outer vertical side of the tray as shown in FIGURE 5, and the lid of the tray is then secured in position.

The top of the furnace is then lowered to close the furnace, and the interior of the tray 18 filled with nitrogen, which is conveniently fed, by means of a gland 34 encircling the shaft 22, into a duct 35 extending along the axis of the shaft, the duct being connected within the furnace to a silica manifold 36 communicating with holes 37 in the base of the tray 18 at three spaced points. The tray 18 is set into rotation and the heating commenced by air/gas burners 38 playing directly on the tray through apertures 39 in the wall of the furnace.

The tray, which is approximately 2 feet in diameter, is rotated at a speed of approximately 270 r.p.m. to give an acceleration of about 25 $g$, and the heating is continued until the furnace temperature reaches that corresponding to the attainment of the required sealing temperature (about 850° C.) within the tray, this being determined by previous trial and calibration. The time required for this to take place will depend upon the form of heating employed, and with an appropriate form of heating may be of the order of four to five minutes.

The gas supply to the burner jets is then switched off and the air jets allowed to play on the tray 18, whilst still rotating and with the furnace top 33 removed, until the tray has cooled down sufficiently for it to be opened and the boats unloaded.

The completed seals may then be removed from the boats.

The seals described provide part of the envelope of a transistor, the transistor components being subsequently connected to the parts of the wires extending from the closed end of the sleeve, and a copper cup-shaped member, closed at one end and provided with an outwardly directed flange at the other, then being fitted over the sleeve and being secured to it by the attachment of the flanges in any suitable manner.

A modified form of the centrifuge apparatus described with reference to FIGURES 4 and 5, which has also been found suitable for forming seals of the kind illustrated in FIG. 1, is provided, as shown partly in FIGURE 6, with an annular tray 40 and detachable lid 41 which are both formed of chronite instead of silica; the lid 41 in this modification, which is shown partly raised in the figure, is provided with downwardly-directed flanges 42 at its inner and outer edges, and these fit over the walls 43 of the tray, which are stepped at the top to receive the lid as shown, the flanges serving to retain the lid in position on the tray. The manifold (not shown) for feeding nitrogen to the interior of the tray in use of the apparatus is also of chronite, but otherwise the apparatus is similar to that illustrated in FIGURES 4 and 5, the boats being arranged to be placed in the tray with their arcuate bases fitting against the outer vertical side 43 of the tray 40 and the tray being heated whilst being rotated by means of air/gas flames playing directly on the tray through apertures in the wall of the furnace.

An alternative form of holder assembly which is also suitable for forming seals of the kind illustrated in FIGURE 1, and which may be more convenient in some cases, is illustrated in part in FIGURE 7, and comprises an arcuate base member 44 supporting on its concave surface a number of flat rectangular carbon blocks 45 each having a plurality of cylindrical recesses 46 in the surface which is directed towards the centre of curvature of the base; each of the recesses is arranged to support a sleeve 1 with its flanged end also directed towards the centre of curvature and its opposite end resting on the bottom of the recess. Three axially-directed holes 47 are formed in the bottom of each recess for receiving and supporting the lower ends of the wires 2, and an apertured metal plate 48, attached to the base and spaced from the carbon blocks by any suitable supporting and spacing means (not shown) serves to support the opposite ends of the wires.

In forming the seals the sleeves and wires are loaded into their respective recesses in the carbon blocks and, after a glass charge has been placed in each sleeve, the assembly, together with a number of similarly prepared assemblies, are loaded into the tray of the centrifuge with the convex sides of the bases against the outer vertical side of the tray, the seals being completed by heating the tray whilst it is rotated at an appropriate speed in the manner previously described.

Another form of seal to which the invention is applicable, and which forms part of the envelope of a silicon junction diode, consists, as shown in FIGURE 8, of a cylindrical copper sleeve 51 of approximately the same dimensions as that of the seal illustrated in FIGURE 1, the sleeve also being flanged at one end and having two copper wires 52 sealed into it by means of a glass bead 53 closing the other end of the sleeve. In this seal however the wires extend for only about 5 millimetres from the flanged end and about 50 millimeters from the closed end of the sleeve.

One suitable form of holder assembly for forming such seals consists of a plurality of carbon blocks 54 (only one of which is shown) each provided with a number of recesses in one surface for receiving the unflanged ends of a corresponding number of sleeves 51 and supported on a nickel plate 55; the latter is of rectangular shape bent into arcuate form along its length and supports the cylinders on its concave surface with their recessed surfaces directed towards the centre of curvature of the plate. The plate 55 is connected by means of a web 56 to a further rectangular plate 57, also of arcuate form, which provides the base of the assembly.

In forming the seals in accordance with the invention the sleeves 51 are each loaded into a corresponding recess in the carbon blocks with the flanges uppermost, and two wires are then inserted into corresponding holes extending axially through the base of each of the cylindrical rcesses, the lower ends of the wires passing through suitably positioned apertures in the plate 55 and being guided into further locating holes in a flange 58 located a short distance above the base 57 of the assembly, the base plate 57 serving to position the wires in an axial direction.

Then after a glass charge in the form of a small tube of glass has been inserted into each of the sleeves, the holder assembly, together with a number of similarly prepared holder assemblies, are loaded into the tray of a suitable centrifuge apparatus, for example as illustrated in FIGURES 4 and 5, with the bases of the assemblies fitting against the outer wall of the tray, and the seals are completed in the same way as those described with reference to FIGURE 1

Figures 9, 10:
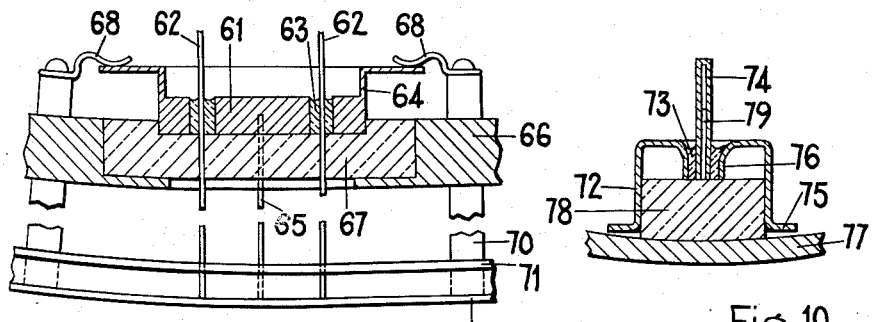

FIGURE 9 illustrates a further form of seal which has been found suitable for mass production by the method of the present invention.

This seal, which provides the base of a transistor power rectifier consists of a flat copper disc 61 having a peripheral wall 64 upstanding from one surface of the disc, the rim of which is turned radially outwards to form a flange as shown. A first copper wire 65 extends from a hole in the opposite side of the disc and is in electrical contact with the disc. Two further wires 62 also of copper are sealed, by means of glass beads 63, through two holes extending axially through the disc.

A suitable holder assembly for use in the manufacture of seals of this kind consists of an arcuate metal plate 66 carrying on its concave surface a plurality of carbon blocks 67 each having a cylindrical recess disposed centrally on one surface and supported on the plate with their recessed surfaces directed towards the centre of curvature of the plate. In forming the seals each disc 61, with the wire 65 already sealed thereto, is initially placed in the recess of a respective carbon block, with the wire 65 projecting through a hole formed in the block at the bottom of the recess, and are kept in place by spring clips 68. The two wires 62 of each seal are then inserted in the holes in the appropriate copper disc 61 and are passed through corresponding holes in the carbon block 67 which serve to hold the wires centrally within the holes in the disc. A further arcuate plate 69, connected to the plate 66 by metal posts 70, and upon which the lower ends of the wires 62 rests, position the wires axially with respect to the copper disc 61, and a flange 71, provided with appropriately positioned holes through which the lower ends of the wires project, assists in holding the wires in position. A glass charge is inserted into each of the holes in the copper discs in the holder assembly and the assembly is placed, together with a number of similarly prepared assemblies, within the tray of the centrifuge apparatus, with the base plate 69 against the outer wall of the tray, the seals then being completed in the same way as those previously described.

Figures 11, 12:
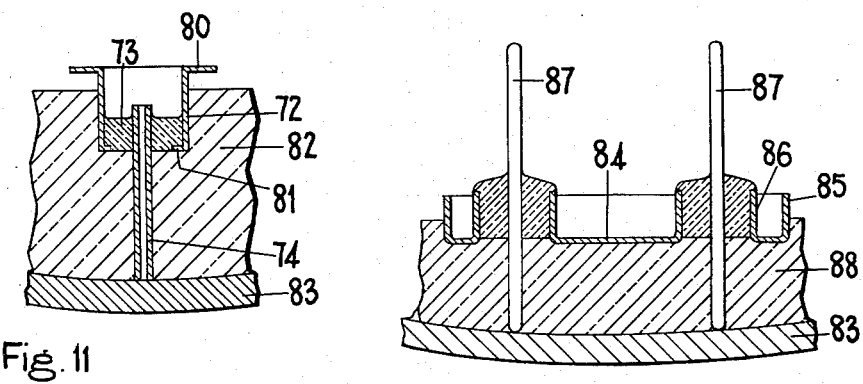

The seals illustrated in FIGURES 10 and 11 are different from those previously illustrated in that each consists of a copper sleeve 72 having sealed into it by means of a glass bead 73 a single narrow copper tube 74.

In the seal shown in FIGURE 10 which provides part of the envelope of a silicon junction rectifier, the sleeve is provided with an outwardly directed flange 75 at one end and is closed at the other apart from a central aperture surrounded in the inside of the sleeve by a short hollow cylindrical extension 76. The tube 74 is supported centrally within this aperture with one end flush with the inner end of the cylindrical extension 76 and the other end, which is closed, extending for a short distance beyond the closed end of the sleeve 72.

A suitable holder assembly for forming seals of this kind comprises a rectangular metal plate 77 bent into arcuate form along its length and provided with a number of cylindrical carbon projections 78 (only one of which is shown) on its concave surface, each arranged with its axis directed towards the centre of curvature of the plate. A metal pin 79 projects coaxially from the inner end of each projection.

In forming the seals the open ends of a number of sleeves 72 are each placed on a corresponding projection, as shown, with the inner end of the cylindrical extension 76 resting on the upper surface of the projection and the pin 79 extending coaxially through the extension. The tubes 74 are then placed over the upper ends of the pins which support them coaxially within the sleeve, the lower ends of the tubes resting against the upper surfaces of the projections 78. A glass charge is then inserted into the cylindrical extensions 76 of each of the sleeves 72 and the holder assembly placed into the tray of the centrifuge apparatus with the base plate fitting against the outer vertical side of the tray, the seal being completed by heating the centrifuge whilst it is rotated at an appropriate speed, and whilst nitrogen is fed into the tray, as previously described.

In the seal shown in FIGURE 11, which also provides part of the envelope of a silicon junction rectifier, the sleeve 72 is also provided with an outwardly directed flange 80 at one end, and the tube 74 is sealed, by means of the glass bead 73, coaxially into the opposite end of the sleeve which is open apart from a small inwardly-directed flange 81, the tube in this case also being open at both ends.

A suitable form of holder assembly for forming seals of this latter kind consists of a number of recessed carbon blocks 82 mounted on the concave surface of a rectangular metal plate 83 of arcuate form as in the case of the assembly illustrated in FIGURE 8, the plate in this assembly however providing the base of the assembly. Each of the recesses is of cylindrical shape and is arranged to support one of the sleeves 72 with the outwardly-flanged end of the sleeve uppermost.

A cylindrical hole extends through the block coaxially with each recess for receiving the tube 74 and for holding it coaxially within the sleeve during the formation of the seal.

Figure 13:
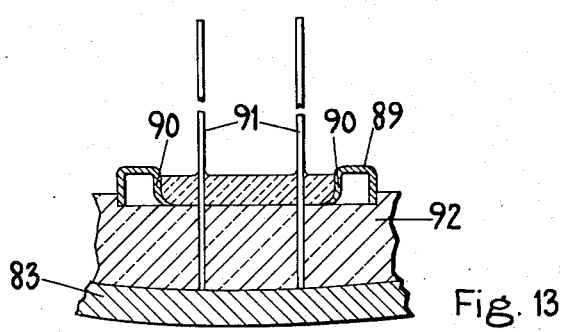

Two further seals which provide the bases of different forms of quartz crystal devices are illustrated in FIGURES 12 and 13. The first of these consists of an elongated sheet metal pressing 84 surrounded by a flange 85 and pierced at each end by a circular aperture, the apertures each being surrounded by a flange 86 of cylindrical shape projecting from the base of the pressing in the same direction as the peripheral flange 85. A metal pin 87 is sealed into each of these apertures by means of a glass bead. Both the pressing and the pins are conveniently formed of a "Kovar" or other similar alloy.

A holder assembly suitable for forming seals of this kind is similar to that illustrated in FIGURE 11, with the carbon blocks 88 suitably recessed and apertured for supporting the pressing and the pins 87 as shown.

The seal illustrated in FIGURE 13 also consists of a sheet metal pressing 89 of elongated shape, the pressing having a single elongated aperture extending lengthwise along it and provided around its inner and outer edges with flanges 90 extending from the pressing in the same direction. A glass bead fills the aperture in the pressing and supports two metal wires 91 which extend through the aperture near opposite ends of the pressing.

A holder assembly suitable for forming seals of this kind is similar to that described with reference to FIGURES 11 and 12 with the carbon blocks 92 appropriately recessed and apertured for receiving the pressing and the wires and for supporting them in their sealing positions. In forming these seals however the pressings are arranged to be supported with the edges of the flanges directed towards the carbon blocks as shown.

The seals illustrated in FIGURES 11, 12 and 13 are formed in the same way as the seals previously described, the holder assemblies with the components loaded into them together with the appropriate glass charges being placed within the annular tray of the centrifuge with the bases 83 of the assemblies fitting against the outer wall of the tray, and the centrifuge then being heated to the required sealing temperature whilst filled with nitrogen and rotated at an appropriate speed as previously described.

The glasses used in forming the seals described should, of course, be suitably matched to the wires and to the components to which they are sealed as in known sealing techniques, and suitable glass compositions will be readily apparent to those skilled in the art of glass technology.

I claim:
1. A method of forming a seal of the kind in which at least one elongated conducting element is sealed within an aperture in a surrounding member by means of a glass bead which fills the cross-section of at least part of the aperture, said method comprising the steps of closing one end of the aperture with a non-glass-wetted surface, inserting the conducting element into the aperture and supporting it within the aperture in the position in which it is to be sealed to the member, introducing a glass charge into the aperture, and heating the glass to the appropriate glass-melting temperature while rotating the assembled member and element about an axis, with the element lying radially and the closed end of the aperture directed outwards away from said axis, at a speed sufficient for the centrifugal force generated to press the molten glass outwards against said non-glass-wetted surface and into good sealing contact with the element and the member.

2. A method according to claim 1 wherein the heating of the glass is effected in an inert atmosphere.

3. A method according to claim 2 wherein the heating of the glass and the rotation of the member and element are effected in a closed centrifuge and wherein after the formation of the seal the heating is discontinued, while the centrifuge is still closed and rotated, to effect the annealing of the seal.

4. A method of mass producing seals of the kind in which at least one elongated conducting element is sealed within an aperture in a surrounding member by means of a glass bead which fills the cross-section of at least part of the aperture, said method comprising the steps of closing one end of the aperture in each of a plurality of members, each designed to form the surrounding member of a seal, with a non-glass-wetted surface, inserting into the apertures in the members the respective conducting elements and supporting them in the positions in which they are to be sealed to the members, introducing a glass charge into each aperture, supporting the members equidistantly from an axis with the conducting elements extending radially and the closed ends of the apertures directed outwards, and heating the glass charges while rotating the plurality of members and elements simultaneously about said axis at a speed sufficient for the centrifugal force generated to press the molten glass charge within each of the apertures outwards against said non-glass-wetted surface and into good sealing contact with the respective member and element.

5. Apparatus for use in mass producing seals of the kind in which at least one elongated conducting element is sealed within an aperture in a surrounding member by means of a glass head, said apparatus comprising a furnace, a centrifuge in the form of an annular tray, having a close fitting annular lid, mounted for rotation about its axis within the furnace, a plurality of holders each of which includes at least one non-glass-wetted part, said holders comprising means for supporting at least one said member with one end of its aperture closed by a said non-glass-wetted part, which non-glass-wetted part provides means for supporting within the aperture of said one member an element which is to be sealed to the member and a glass charge for forming the said glass bead, with the element in the position in which it is to be sealed to the member, the holders being supportable within the centrifuge with the elements lying radially and the ends of the apertures which are closed by the non-glass-wetted parts directed outwards, the apparatus including also means for heating the centrifuge to the glass melting temperature of the charges, and means for rotating the centrifuge at a speed sufficient for the centrifugal force generated to press the molten glass of the charges carried by holders within the centrifuge in use of the apparatus outwards against said non-glass-wetted surface and into good sealing contact with the respective elements and members.

6. Apparatus according to claim 5 wherein the non-glass-wetted part of each holder consists of carbon.

7. Apparatus according to claim 5 wherein each holder is designed to support a plurality of said members, each with one end of its said aperture closed by a non-glass-wetted part of the holder, and wherein the holder is provided with locating holes into which the elements are arranged to fit and which serve to support the elements in the positions in which they are to be sealed to the respective apertured members in use of the apparatus.

8. Apparatus according to claim 5 including means for feeding an inert gas into the centrifuge while it is rotating in use of the apparatus.

References Cited in the file of this patent
UNITED STATES PATENTS

| | | |
|---|---|---|
| 2,374,269 | Breadner et al. | Apr. 24, 1945 |
| 2,671,291 | Daley | Mar. 9, 1954 |